Dec. 26, 1950  R. R. FLUKE  2,535,791
LEVEL WITH MAGNETIC SECURING MEANS
Filed May 31, 1947  2 Sheets-Sheet 1
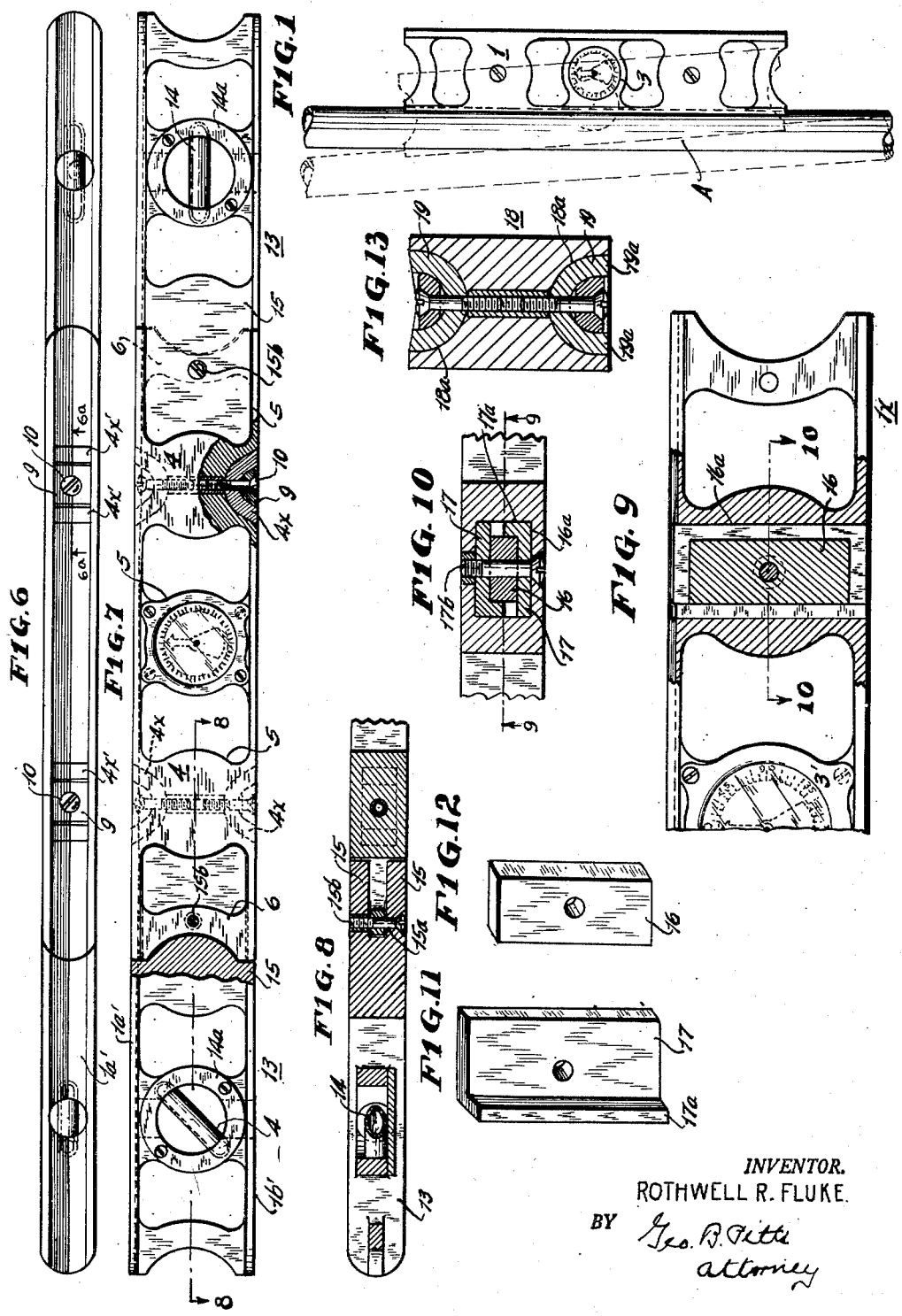
INVENTOR.
ROTHWELL R. FLUKE.
BY Geo. B. Pitte
attorney

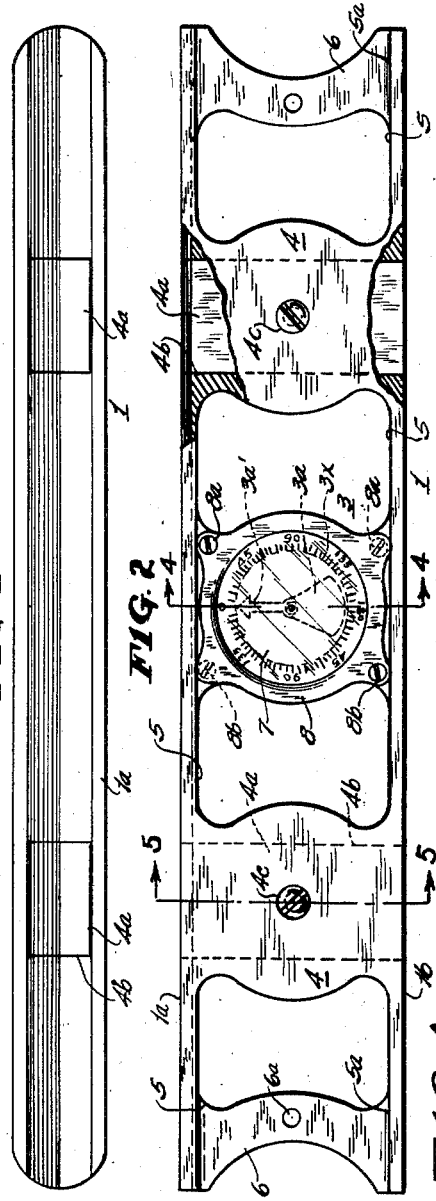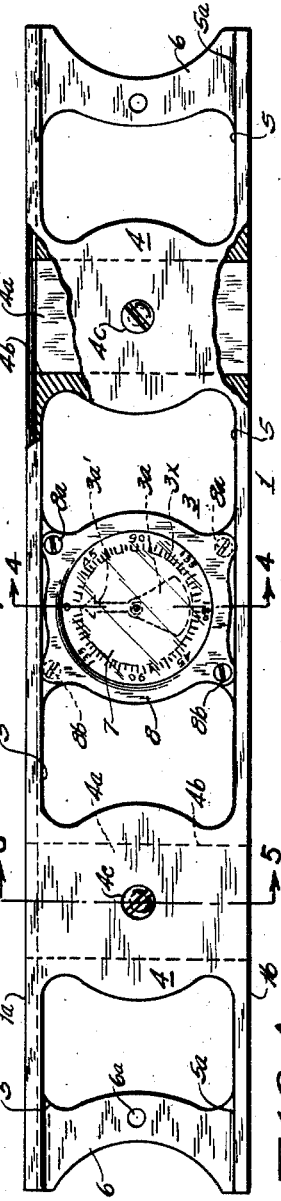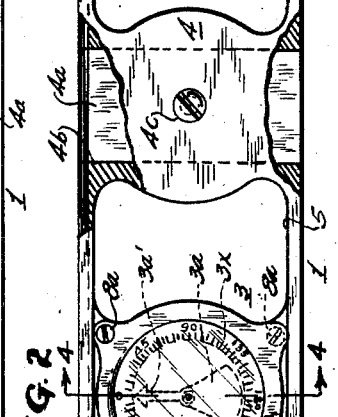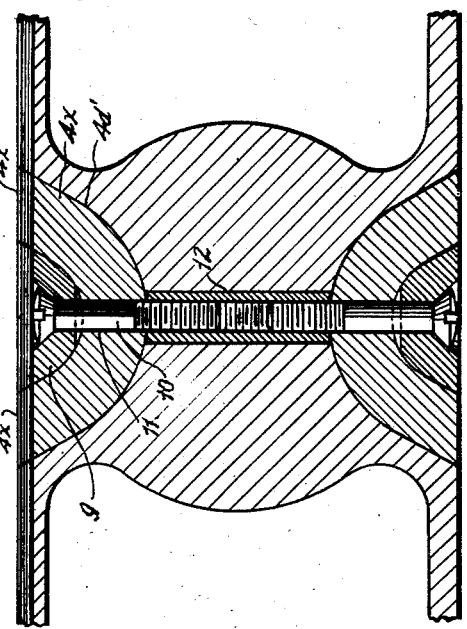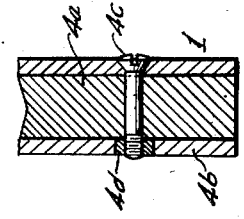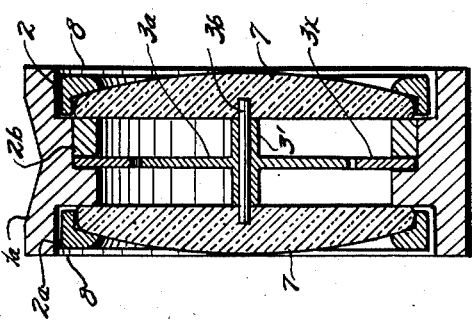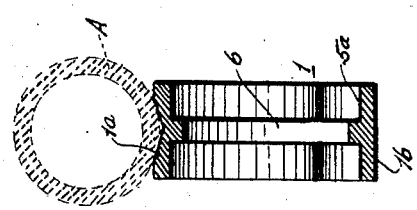

Patented Dec. 26, 1950

2,535,791

UNITED STATES PATENT OFFICE 2,535,791

LEVEL WITH MAGNETIC SECURING MEANS

Rothwell R. Fluke, Cleveland, Ohio, assignor to The Buckeye Plastic Corporation, Cleveland, Ohio, a corporation of Ohio Application May 31, 1947, Serial No. 751,553

1 Claim. (Cl. 33—207)

This invention relates to a level adapted for use by carpenters, plumbers, pipe fitters and other mechanics for use in positioning pipes and various structural elements.

One object of the invention is to provide an improved level having means, disposed internally thereof for fixedly, removably mounting the level on the member which is to be positioned, while the latter is being adjusted or moved into its predetermined final position.

Another object of the invention is to provide an improved level provided with means for automatically, removably securing the level on the member, which is to be positioned while the latter is being adjusted or moved into its predetermined final position, whereby the operation of positioning the member is facilitated as to labor and time.

Another object of the invention is to provide an improved level having a level indicator and magnetic securing means common to both its surface engaging side edges and adapted to be used in positioning horizontally and vertically disposed members or devices.

Another object of the invention is to provide an improved level having detachable end sections, whereby the length of the level may be changed to adapt it to various operating conditions.

Other objects of the invention will be apparent to those skilled in the art to which the invention relates from the following description taken in connection with the accompanying drawings, wherein Fig. 1 is a fragmentary elevational view showing one application of a level embodying my invention.

Fig. 1a is a plan view.

Fig. 2 is a side elevation.

Fig. 3 is an end elevation.

Figs. 4 and 5 are sections on the lines 4—4 and 5—5, respectively, of Fig. 2.

Fig. 6 is a plan view of a level showing a modified form of construction; also, showing extension elements thereon.

Fig. 6a is a fragmentary section on the line 6a—6a of Fig. 6, enlarged.

Fig. 7 is a side elevation of the parts shown in Fig. 6.

Fig. 8 is a section on the line 8—8 of Fig. 7.

Fig. 8a is a detail perspective view of the magnet as employed in the modification shown in Figs. 6, 6a and 7.

Fig. 9 is a fragmentary view, partly in elevation and partly in section on the line 9—9 of Fig. 10.

Fig. 10 is a section on the line 10—10 of Fig. 9.

Figs. 11 and 12 are perspective views of parts shown in Figs. 9 and 10.

Fig. 13 is a sectional view showing another modification.

In the drawings, referring to Figs. 1, 1a, 2, 3, 4 and 5, 1 indicates as an entirety an elongated member shaped transversely to provide from end to end thereof surface engaging side edges or walls 1a, 1b, the side edge 1a being grooved transversely to adapt it for engagement with the wall of a pipe A or other curvilinear surface (see Fig. 1) and the side edge 1b being flat transversely. The member 1 is formed of non-magnetic, relatively light material, preferably a material capable of being die cast or molded, the level heretofore made by me being formed of metal or metal alloy, such as aluminum. Intermediate its ends, the member 1 is formed with a through transverse opening 2 to accommodate a lever indicator, indicated as an entirety at 3, and between the opening 2 and each outer end of the member 1, I provide means, indicated as an entirety at 4, which are disposed internally of the member 1 and common to the opposite side edges 1a, 1b, for automatically, removably securing the level to the surface of any member having a ferrous base which is to be positioned in a predetermined plane, when either wall 1a or 1b is seated on or engaged with the member. The member 1 at opposite sides of the opening 2 and outwardly of the securing means 4, is formed with openings 5 to reduce the weight of the member 1; also, the opposite side walls of the member 1, outwardly of the outer openings 5, is cut away, as shown at 5a, to reduce the weight of the member 1 and provide at each end thereof a bar 6 disposed midway the opposite outer side faces of the side walls 1a, 1b, for a purpose later set forth, each bar 6 being formed with an opening 6a.

The level indicator 3 consists of an element 3a fixed to a hub 3' rotatably mounted on a transverse shaft 3b and an annulus 3x concentric to the shaft 3b and provided on its opposite faces throughout its circumference with graduations. One end of the element 3a terminates in a pointer 3a' movable relative to the graduations on the annulus 3x, the opposite end of the element 3a being enlarged (see Fig. 2) to provide a weight which maintains the element 3a perpendicular to the horizontal in a well known manner. To mount the parts of the level indicator 3 in the opening 2, the walls of the latter are annularly recessed at 2a to form seats for magnifying lens 7 and rings 8 in overlapping engagement with the lens 7, the rings 8 having lugs 8a which are secured to the member 1 by screws 8b. One recess 2a is cut away as shown at 2b to provide a seat for the annulus 3x, a spacer 2c being provided between the annulus 3x and the adjacent lens 7 to secure the annulus in its seat. As shown, the opposite ends of the shaft 3b are mounted in recesses 7a formed in the inner faces of the lens 7 and the hub 3' has a length equal to the spacing of the lens 7 to engage therewith and prevent endwise movement of the hub. The indicating element 3a is fixed to the hub 3b intermediate its ends and the cutaway 2b extends inwardly far enough to support the annulus 3x in the plane of the element 3a. As the recesses 2a are of equal depth, it will be observed that the element 3a swings in a plane coincident with the longitudinal axis of the member 1 and that the annulus 3x is disposed in this plane. As the pointer 3a' is closely related to the inner periphery of the annulus 3x, accurate readings of the indicator 3 from either side of the member 1 may be made whether the line of vision extends at right angles to the indicator 3 or otherwise.

The securing means 4 shown in Figs. 1a, 2 and 5, outwardly and at each side of the level indicator 3 consist of a permanent bar magnet 4a mounted in an opening 4b extending through the member 1 in line with the side edges or walls 1a, 1b, and terminating at their outer ends adjacent the outer ends of the opening 4b, preferably substantially flush with the side edges or walls 1a, 1b, so as to have contact with the member to be positioned. Thus it will be noted that when the level is positioned in engagement with the member to be leveled, in any predetermined plane, and the member is formed of or provided with magnetic material, the magnets 4a, 4a, establish or induce in the member opposed magnetic lines of force, the effect of which is to magnetically relate or secure the magnets and member together, and accordingly the level is automatically and removably mounted on the member, although actual contact of the magnets with the member to be positioned is not required. That face or pole of each magnet 4a related to the side edge or wall 1a is grooved in cross section longitudinally of the wall to correspond to the groove faces of the latter. Each magnet 4a is of a size to fit the adjacent opening 4b and is secured to the side walls thereof by a screw 4c extending through alined openings formed in the side walls and magnet (see Fig. 5) and threaded into an insert 4d suitably mounted in the adjacent side wall.

The magnetic securing means 4 shown in Figs. 6, 6a, 7 and 8, outwardly and at each side of the level indicator 3 consist of a pair of horseshoe magnets 4x, 4x, each mounted in a longitudinally extending recess 4d' formed in the member 1 and extending inwardly of the adjacent surface engaging side edge or wall and shaped to form a seat for the magnet. The poles 4x' of each magnet 4x are disposed in line with the adjacent side edge or wall and preferably terminate substantially flush therewith, the faces of the magnet poles related to the side edge or wall 1a being transversely grooved (see Figs. 6 and 8a) corresponding to and in alinement with the groove formed in the wall 1a. Each magnet 4x is secured in its seat 4d' by a key element 9 engaging the inner side wall of the adjacent magnet and formed with an opening 9a and a screw 10 countersunk in the element 9 and extending through the opening 9a and an opening 11 formed in the adjacent magnet 4x and threaded into an insert 12 suitably mounted in the wall of the member 1 (see Fig. 6a).

The level constructed as hereinbefore described is capable of general use, but is particularly adapted for use where the member to be supported in a predetermined plane is formed of a material which is capable of being magnetized or inductively charged with magnetism. This use of the level is shown in Fig. 1 where it is applied to an iron pipe and supported thereon due to the magnetic attraction between the magnets and wall of the pipe. Thus it will be seen that the level is removably secured to the pipe and allows the operative to observe the indicator and substantially simultaneously adjust or move the pipe into final position without again handling the level, rather than repeatedly applying and removing the level from the pipe until the desired position of the latter is attained; hence the operation of positioning pipes, sills and other members in various positions is greatly facilitated and less time is required therefor.

Where the nature of the work requires a relatively long level, I provide extension members 13, 13, which are endwise detachably connected to the outer ends of the member 1 and by preference each is provided with a spirit level indicator 14. The extension members are similar in construction, except that in one extension member 13, the indicator 14 is disposed parallel to the surface engaging walls 1a', 1b', and in the other member the indicator 14 is disposed at an angle of 45 degrees to these walls. Each extension member 13 is shaped to provide surface engaging walls 1a', 1b', adapted to aline with the walls 1a, 1b, respectively, and between the walls 1a', 1b', it is formed with openings 13a to reduce the weight of the extension member. The extension members 13, 13 are adapted to be connected to the bars 6 of the member 1, shown in Figs. 1a, 2 and 3, but they are shown for convenience in connected relation to the form of level shown in Figs. 6, 6a, 7 and 8. As shown in these latter figures one end of each member 13 terminates in spaced connecting elements 15 which slidably fit the adjacent bar 6 and inner opposed faces of the walls 1a', 1b', at opposite sides of the adjacent bar 6 and engage the inner side wall of the adjacent opening 5. The elements 15 are formed with alined openings 15a in alinement with the opening 6a in the adjacent bar 6 for a screw 15b to secure the member 1 and adjacent member 13 together. As will be observed, the walls of the elements 15, bar 6 and walls 1a', 1b', cooperate to support each extension member 13 endwise of the member 1 and its surface engaging walls 1a', 1b', in the plane of the walls 1a, 1b, respectively. By preference, the walls 1a' of the extension members 13 are grooved transversely corresponding to that of the wall 1a. Each indicator 14 is seated in a recess formed in the level member 1 and engaged by a ring 14a, which is secured in position by screws.

Where the level is provided with extensions 13, and employed to position pipes and members formed of magnetizable material, the magnetic means serve to support the level on the member so that the operative may determine the adjustment of the member by observing the indicator 3 or one of the indicators 14.

Referring to Figs. 9, 10, 11 and 12, 1x indicates an elongated member constructed as shown in Figs. 1, 1a, 2 and 3 and mounting a level indicator 3' similar in construction to the indicator 3. In this form of construction the magnetic securing means consist of the following: 16 indicates a permanent bar magnet mounted in a through opening 16a formed in the member 1x and disposed in line with the surface engaging walls 1x', the opposite ends or poles of the magnet 16 terminating inwardly of the ends of the opening 16a. 17 indicates a pair of plates, formed of magnetic material, such as soft iron, mounted in the opening 16a at opposite sides of and preferably in engagement with the magnet 16, but spaced from each other by the latter; the magnet 16 serving to establish or induce in the plates 17 magnetic lines of force which are effective to secure the member 1x to the member to be positioned. The opposite ends of the plates 17 terminate substantially flush with the walls 1x' and preferably one end of one plate and the remote end of the other plate are provided with inturned extensions 17a to increase the contacting surface of each plate with the member to be positioned. The ends of the plates 17 related to the groove wall 1x' are grooved in line with the groove thereof. A screw 17b secures the magnet and plates in position.

In Fig. 13, which is a transverse section of a level and illustrates another modified form of construction, 18 indicates an elongated member similar to like parts shown in Figs. 6 and 7, except that the seats or recesses 18a formed in the member 18 for the horseshoe magnets 19 are disposed transversely thereof and support the poles 19a of the magnets in a plane extending at right angles to the member 18. The magnets 19 are preferably mounted in the seats 18a similarly to mountings for the magnets 4x.

To those skilled in the art to which my invention relates, many changes in construction and widely differing embodiments and applications thereof will suggest themselves without departing from the spirit and scope of the invention. My disclosures and the description herein are purely illustrative and are not intended to be in any sense limiting.

What I claim is:

A level provided intermediate its ends with plumb-and-level indicator devices and comprising an elongated member having longitudinal side surfaces each adapted to engage a work surface, one of said surfaces being formed from end to end thereof with a groove, said member at each side of one of the indicator devices being formed with a through opening, a permanent magnet within each opening intermediate the opposite ends thereof, plates formed of ferrous metal disposed within each opening and spaced by and engaging with the opposite sides of the adjacent magnet, and means for removably securing each magnet and the adjacent plates in one of said openings, said plates in each opening terminating at their opposite ends substantially flush with said side surfaces.

ROTHWELL R. FLUKE.

REFERENCES CITED

The following references are of record in the file of this patent:

UNITED STATES PATENTS

| Number | Name | Date |
|---|---|---|
| 723,518 | Ellison | Mar. 24, 1903 |
| 898,349 | Fielding | Sept. 8, 1908 |
| 986,008 | Kennedy | Mar. 7, 1911 |
| 1,130,610 | Kane | Mar. 2, 1915 |
| 1,617,937 | Boucher | Feb. 15, 1927 |
| 2,068,128 | Galford | Jan. 19, 1937 |
| 2,133,605 | Wikstrom | Oct. 18, 1938 |
| 2,269,149 | Edgar | Jan. 6, 1942 |
| 2,292,968 | Peters | Aug. 11, 1942 |